(12) United States Patent
Choi et al.

(10) Patent No.: US 12,536,656 B2
(45) Date of Patent: Jan. 27, 2026

(54) METHOD OF GENERATING EXCISION TOOL INFORMATION USING CERVICOGRAPHY IMAGE AND ANALYSIS APPARATUS

(71) Applicant: THE CATHOLIC UNIVERSITY OF KOREA INDUSTRY-ACADEMIC COOPERATION FOUNDATION, Seoul (KR)

(72) Inventors: Youn Jin Choi, Seoul (KR); Soo-Young Hur, Gyeonggi-do (KR); Heekyoung Song, Seoul (KR); Jaeyoung Min, Gyeonggi-do (KR)

(73) Assignee: THE CATHOLIC UNIVERSITY OF KOREA INDUSTRY-ACADEMIC COOPERATION FOUNDATION, Seoul (KR)

( * ) Notice: Subject to any disclaimer, the term of this patent is extended or adjusted under 35 U.S.C. 154(b) by 318 days.

(21) Appl. No.: 18/319,981

(22) Filed: May 18, 2023

(65) Prior Publication Data

US 2023/0289966 A1    Sep. 14, 2023

Related U.S. Application Data

(63) Continuation-in-part of application No. PCT/KR2021/015116, filed on Oct. 26, 2021.

(30) Foreign Application Priority Data

Nov. 18, 2020   (KR) .................. 10-2020-0154491

(51) Int. Cl.
*G06T 7/00*   (2017.01)
*G06T 7/60*   (2017.01)

(52) U.S. Cl.
CPC .............. *G06T 7/0012* (2013.01); *G06T 7/60* (2013.01); *G06T 2207/10068* (2013.01); *G06T 2207/20081* (2013.01); *G06T 2207/30096* (2013.01)

(58) Field of Classification Search
CPC ............... G06T 7/0012; G06T 7/60; G06T 2207/10068; G06T 2207/20081; G06T 2207/30096
See application file for complete search history.

(56) References Cited

U.S. PATENT DOCUMENTS

| 2021/0196384 A1* | 7/2021 | Shelton, IV | ............ G06T 15/20 |
| 2023/0040427 A1* | 2/2023 | Hammudi | .............. A61B 34/20 |

FOREIGN PATENT DOCUMENTS

| KR | 20190060606 A | 6/2019 |
| KR | 20190095922 A | 8/2019 |

(Continued)

OTHER PUBLICATIONS

Jaworek-Korjakowska, Joanna, Pawel Kleczek, and Marek Gorgon. "Melanoma Thickness Prediction Based on Convolutional Neural Network With VGG-19 Model Transfer Learning." 2019 IEEE/CVF Conference on Computer Vision and Pattern Recognition Workshops (Cvprw). IEEE, 2019. 2748-2756. Web. (Year: 2019).*

(Continued)

*Primary Examiner* — John R Wallace
(74) *Attorney, Agent, or Firm* — Tarolli, Sundheim, Covell & Tummino LLP (57) ABSTRACT

A method of generating excision tool information using a cervicography image includes receiving, by an analysis apparatus, a cervicography image of a patient, inputting, by the analysis apparatus, the cervicography image to a learning model to detect a lesion area, additionally setting, by the analysis apparatus, a margin area based on the lesion area to determine an excision area, and selecting, by the analysis (Continued)

apparatus, one excision tool according to a shape and size of the excision area, or generating a source model for manufacturing an excision tool based on the shape and size of the excision area.

11 Claims, 6 Drawing Sheets

(56) References Cited

FOREIGN PATENT DOCUMENTS

| KR | 102155381 B1 | 9/2020 |
|---|---|---|
| WO | 2019148268 A1 | 8/2019 |

OTHER PUBLICATIONS

International Search Report dated Feb. 21, 2022, for corresponding International Application No. PCT/KR2021/015116.
CooperSurgical, Premier Products for Women's Health Care, (2012), 81 pages retrieved from internet: http://www.coopersurgical.com.

\* cited by examiner

500 ated on 26 Oct. 2021, which claims priority to KR Application
METHOD OF GENERATING EXCISION TOOL INFORMATION USING CERVICOGRAPHY IMAGE AND ANALYSIS APPARATUS

CROSS-REFERENCE TO RELATED APPLICATION

The present application is a Continuation in Part of International Application No. PCT/KR2021/015116, filed on 26 Oct. 2021, which claims priority to KR Application No. 10-2020-0154491, filed on 18 Nov. 2020, the entirety of each of which is incorporated by reference.

BACKGROUND

1. Field of the Invention

The following description relates to a technique of determining an excision area for conization using a cervicography image and providing an excision tool.

2. Discussion of Related Art

Cervical cancer is cancer that develops at an entrance of a woman's uterus and is known to develop due to an early sexual life or many sexual partners. In fact, 90% or more of cervical cancers are caused due to human papiloma virus (HPV) infection.

Currently, PAP smear and human papiloma virus diagnosis (HPV typing) are mainly used for screening for a precancerous lesion of cervical cancer. Depending on examination results, it is performed in such a way that a cervical enlargement image is captured, and a professional medical staff visually interprets an image of a cervix and sets up a future treatment plan. In general, a medical professional performs an examination in a state in which a lesion area is enlarged using a cervical magnifying glass or a colposcopy. Although there are guidelines for lesion interpretation, there is a problem in that examination results based on objective evidence may not be obtained because the state of the lesion is determined according to subjectivity of the professional medical staff.

Meanwhile, when the state of the lesion is diagnosed as a high-risk state like cervical cancer, a method of removing a lesion area through conization (Conization) has been used as the most effective method. In this case, in order to maximize the treatment effect, there is a need to calculate the exact excision area so that areas where abnormal cells (precancerous lesion cells and cancer cells) occurred are completely removed, but many areas are unnecessarily excised.

SUMMARY OF THE INVENTION

A technology described below is also to provide a technique for determining a customized excision area for a precancerous lesion of cervical cancer or patients with cervical cancer using a cervicography image, and selecting an excision tool to excise the lesion.

In one general aspect, there is provided a method of generating excision tool information using a cervicography image includes receiving, by an analysis apparatus, a cervicography image of a patient, inputting, by the analysis apparatus, the cervicography image to a learning model to detect a lesion area, additionally setting, by the analysis apparatus, a margin area based on the lesion area to determine an excision area, and selecting, by the analysis apparatus, one excision tool according to a shape and size of the excision area, or generating a source model for manufacturing an excision tool based on the shape and size of the excision area.

In another aspect, there is provided a method of generating excision tool information using a cervicography image includes receiving, by an analysis apparatus, a cervicography image of a patient, inputting, by the analysis apparatus, the cervicography image to a learning model to detect an excision area, and selecting, by the analysis apparatus, one excision tool according to a shape and size of the excision area, or generating a source model for manufacturing an excision tool based on the shape and size of the excision area.

In still another aspect, there is provided an analysis apparatus using for generating excision tool information using a cervicography image includes an input device configured to receive a cervicography image of a patient, a storage device configured to store a learning model or program that detects a lesion area in the cervicography image and determines an excision area based on the lesion area, and an arithmetic device configured to determine an excision area including a lesion area in the received cervicography image using the learning model or program, select one excision tool according to a shape and size of the excision area, or generate a source model for manufacturing an excision tool based on the shape and size of the excision area.

DETAILED DESCRIPTION OF EXEMPLARY EMBODIMENTS

The present disclosure may be variously modified and have several exemplary embodiments. Therefore, specific exemplary embodiments of the present disclosure will be illustrated in the accompanying drawings and be described in detail. However, it is to be understood that the present invention is not limited to a specific exemplary embodiment, but includes all modifications, equivalents, and substitutions without departing from the scope and spirit of the present invention.

Terms such as "first," "second," "A," "B," and the like may be used to describe various components, but the components are not to be interpreted to be limited to the terms and are used only for distinguishing one component from other components. For example, a first component may be named a second component and the second component may also be similarly named the first component, without departing from the scope of the present disclosure. A term "and/or" includes a combination of a plurality of related described items or any one of the plurality of related described items.

It should be understood that the singular expression include the plural expression unless the context clearly indicates otherwise, and it will be further understood that the terms "comprises" and "have" used in this specification specify the presence of stated features, steps, operations, components, parts, or a combination thereof, but do not preclude the presence or addition of one or more other features, numerals, steps, operations, components, parts, or a combination thereof.

Prior to the detailed description of the drawings, it is intended to clarify that the components in this specification is only distinguished by the main functions of each component. That is, two or more components to be described below may be combined into one component, or one component may be divided into two or more components for each subdivided function. In addition, each of the constituent parts to be described below may additionally perform some or all of the functions of other constituent parts in addition to the main functions of the constituent parts, and some of the main functions of the constituent parts may be performed exclusively by other components.

In addition, in performing the method or the operation method, processes constituting the method may occur differently from the specified order unless a specific order is explicitly described in context. That is, the respective steps may be performed in the same sequence as the described sequence, be performed at substantially the same time, or be performed in an opposite sequence to the described sequence.

The technology described below analyzes a cervicography image of a subject with a learning model to determine a removal area for conization. Furthermore, the technology described below may provide a service of selecting or designing a removal tool for removing a determined area.

The learning model means a machine learning model. The learning model is meant to include various types of models. For example, the learning model includes a decision tree, a random forest (RF), a K-nearest neighbor (KNN), a naive Bayes, a support vector machine (SVM), an artificial neural network, or the like.

The artificial neural network is a statistical learning algorithm that mimics a biological neural network. Various neural network models are being studied. Recently, a deep learning network (DNN) is attracting attention. The DNN is an artificial neural network model composed of several hidden layers between an input layer and an output layer. Similar to general artificial neural networks, the DNN may model complex nonlinear relationships. Various types of DNN models have been studied. Examples of the DNNs include a convolutional neural network (CNN), a recurrent neural network (RNN), a restricted Boltzmann machine (RBM), a deep belief network (DBN), a generative adversarial network (GAN), relation networks (RLs), and the like.

Cervicography images are generally obtained with equipment such as colposcopy or cervicography. The learning model may use various types of images depending on the type of images used as training data. However, for convenience of description, it is assumed that the following cervicography image is an image acquired through the colposcopy.

Meanwhile, an apparatus that analyzes a cervicography image of a subject is called an analysis apparatus. The analysis apparatus is an apparatus capable of processing data, and may be in the form of a PC, a smart device, or a server.

Figure 1:
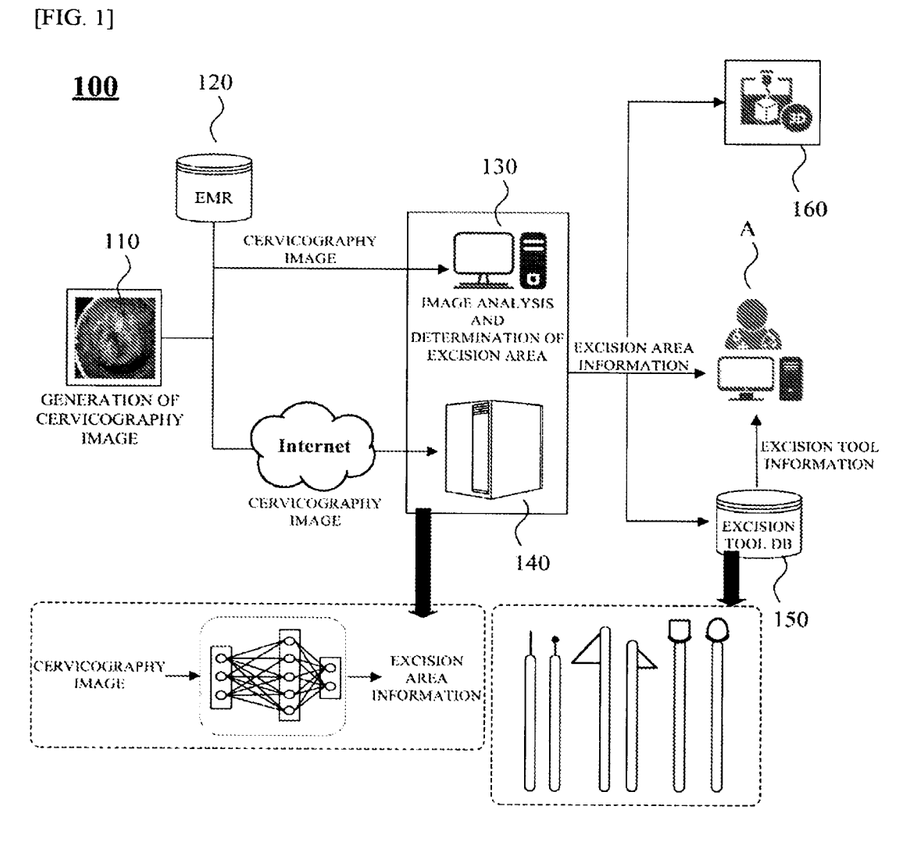
FIG. 1 illustrates an example of a system for detecting an excision area using a cervicography image and providing an excision tool.

FIG. 1 illustrates an example of a system 100 for detecting an excision area using a cervicography image and providing an excision tool.

An image generation device 110 generates a cervicography image of a subject (patient). A medical staff acquires the cervicography image using the image generation device 110. The image generation device 110 may be the above-described colposcopy.

Meanwhile, the image generation device 110 may store the cervicography image of the patient in a device such as electronic medical record (EMR) 120.

The analysis apparatuses 130 and 140 are apparatuses that analyze the cervicography image. FIG. 1 illustrates an analysis apparatus in the form of having a computer terminal 130 and a server 140.

The analysis apparatuses 130 and 140 receive a cervicography image of a subject to be analyzed from the image generation device 110 or the EMR 120.

The analysis apparatuses 130 and 140 may detect a lesion area in the cervicography image and determine an excision area for conic resection. The excision area is an area to be excised by the conization. The analysis apparatuses 130 and 140 may determine an excision area using a learning model trained in advance. For example, as illustrated in the lower part of FIG. 1, the analysis apparatuses 130 and 140 may input the cervicography image to a deep learning model to detect a lesion area and calculate excision area information. A detailed process of calculating the excision area information will be described below.

The analysis apparatuses 130 and 140 may determine an area where all tumor tissues for conization may be removed as a removal area in consideration of a position, size, shape, and the like of a lesion.

The analysis apparatuses 130 and 140 calculate the excision area information. The excision area information may include information such as the position, size, shape, and the like of the removal area for the conization. Meanwhile, the excision area information may be an image in which the excision area is divided in the input cervicography image and displayed.

Medical staff A may check the excision area information through his/her terminal. The medical staff A may perform conization on a patient based on the calculated excision area information. Here, a terminal may be not only a general monitor device, but also a device such as a head mounted display (HMD) and smart glasses implementing augmented reality.

The analysis apparatuses 130 and 140 may transmit the excision area information to an excision tool database 150 to determine an excision tool. The excision tool database 150 stores information on various types of excision tools used for the conization. The analysis apparatuses 130 and 140 may select an excision tool suitable for excision area excision according to the excision area information. The analysis apparatuses 130 and 140 may select an appropriate excision tool from the excision tool database 150 based on the excision area information. Alternatively, the analysis apparatuses 130 and 140 may query the excision area information and receive the matching excision tool information from the excision tool database 150. The excision tool database 150 stores a shape and size of an area that may be excised by the corresponding excision tool for each of the excision tools. The medical staff A may check the excision tool information selected by the analysis apparatuses 130 and 140, and perform surgery with the corresponding excision tool.

Furthermore, depending on the shape of the excision area, there may not be an appropriate excision tool in manufactured goods. In this case, the analysis apparatuses 130 and 140 may transmit the excision area information to a three-dimensional (3D) printer device 160. In this case, the excision area information may be in the form of design information that meets the 3D printer standard. The 3D printer device 160 may print the excision tool according to the input excision area information. The 3D printer device 160 may manufacture a loop of the excision tool or the entire excision tool. The medical staff A may perform surgery with the excision tool calculated by the 3D printer device 160.

Figure 2:
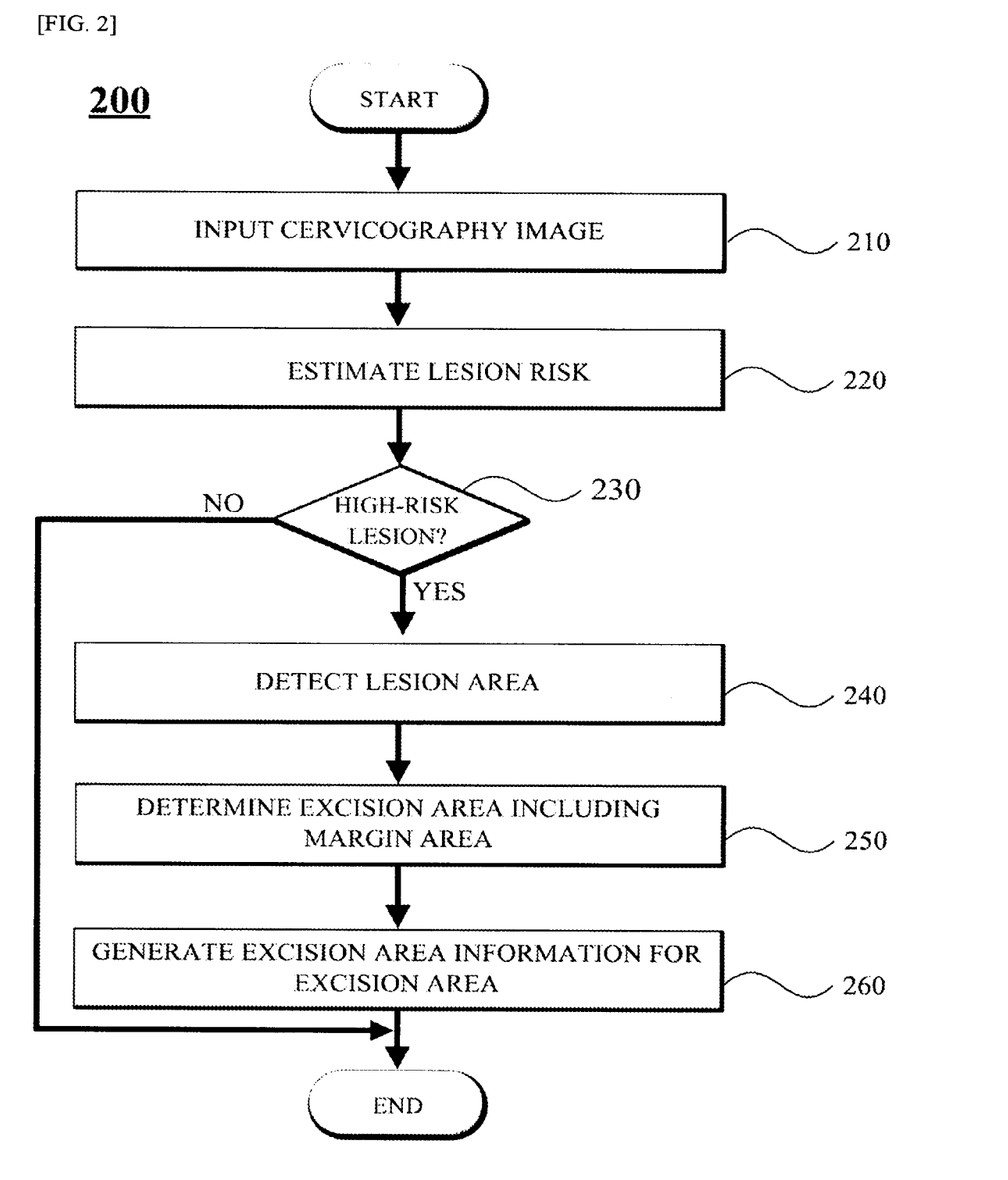
FIG. 2 illustrates an example of a cervicography image analysis process.

FIG. 2 illustrates an example of a cervicography image analysis process 200. The cervicography image analysis process 200 is performed in the analysis apparatus.

The analysis apparatus receives the cervicography image (210).

The analysis apparatus may estimate a risk of a lesion by analyzing the cervicography image (220). The analysis apparatus may input the cervicography image to the learning model. For example, the analysis apparatus may input the cervicography image to a pre-trained deep learning model. Here, the deep learning model may be a model such as CNN, a region-based convolutional neuron network (RCNN), or fast RCNN.

The learning model may extract the features of the input cervicography image and estimate the risk of lesion based on the extracted features. For example, the learning model may calculate the risk of lesion based on features determined according to dysplasia occurring in the cervix, a degree of bleeding, a degree of secretion, or the like. Through this, the analysis apparatus may estimate whether a lesion included in an image corresponds to a high grade squamous intraepithelial lesion (HSIL) or an invasive cervical cancer or a low grade squamous intraepithelial lesion (LSIL).

The analysis apparatus may determine the excision area for the conization when the analysis target is the high grade squamous intraepithelial lesion abnormality (YES in 230).

The analysis apparatus detects the lesion area (240). The analysis apparatus may input the cervicography image to the learning model to extract the lesion area.

In this case, the learning model may be a model different from the model that estimates the lesion risk. For example, the analysis apparatus may detect a lesion area using a segmentation model. The segmentation model may be a model such as a fully convolutional network (FCN), DeebLab, U-Net, and the like.

The analysis apparatus determines a margin area (250). The excision area may be composed of the lesion area and the margin area. Therefore, when the analysis apparatus determines the margin area following the lesion area, the entire excision area is determined (250). The excision area is an area to be excised by the conization.

The margin area is an additional area that is set to sufficiently include the lesion area in excision technique. Thus, the margin area may include normal tissue. The margin area may be a more marginal area by a certain distance (length) starting from an edge of the lesion area, depending on the position and shape of the lesion area. In this case, the analysis apparatus may determine the margin area based on the lesion area calculated by the segmentation model.

Furthermore, the above-described segmentation model may be trained to calculate an area including a margin region in a learning process. In this case, when the analysis apparatus inputs the cervicography image to the segmentation model, the excision area including the margin area is detected.

Meanwhile, the excision area may not be composed only of the lesion area and the margin area. For example, when the lesion area has many curves and is complex, the analysis apparatus may determine the excision area so that the curvature may be reduced to an appropriate level, including the margin area, in consideration of the design of the excision tool.

The analysis apparatus may generate the excision area information when the excision area is determined (260). The excision area information may be various types of information.

First, the excision area information may be an image in which the excision area is displayed in the cervicography image of the patient. The above-described segmentation model may not only classify objects, but also constantly display the classified objects regularly on a screen. Meanwhile, the analysis apparatus may use a generative model instead of the segmentation model. A representative generative model is the GAN. The generative model or the adversarial generative model is a model that generates a new image based on the input image. When the cervicography image is input, the generative model may output an image in which the excision area is divided by color or the like and displayed.

The excision area information may include the size and shape of the excision area. In this case, the size and shape may be expressed in a measurement unit that may be a criterion for selecting the excision tool. Furthermore, the size and shape of the excision area may be expressed through an image. In this case, the analysis apparatus may constantly correct a relative difference between the size of the excision area and the excision tool in the image. The medical staff may select the excision tool after viewing the image. Furthermore, the analysis apparatus may extract the excision tool information (identifier, etc.) suitable for excision from the excision tool database based on the excision area information. The excision tool database should store the shape and size of the excision area for each excision tool in advance.

The excision area information may be the model information that may be input to the 3D printer. The model information means a model source for outputting the excision tool in the 3D. The analysis apparatus may generate a model that may output an excision tool with a loop that is suitable for the excision area.

Furthermore, the analysis apparatus may detect an excision depth of the lesion using the cervicography image. The analysis apparatus may perform the selection of the excision tool and modeling of the excision tool according to the depth of the lesion. In this case, the cervicography image may be a 3D image.

As described above, FIG. 2 illustrates an example of using the learning model. However, the analysis apparatus may estimate a lesion risk using information extracted using a traditional image processing program rather than a learning model. In addition, the analysis apparatus may detect a lesion area using an image processing program rather than the segmentation model, and determine the excision area by setting the margin area based on the lesion area.

Figure 3:
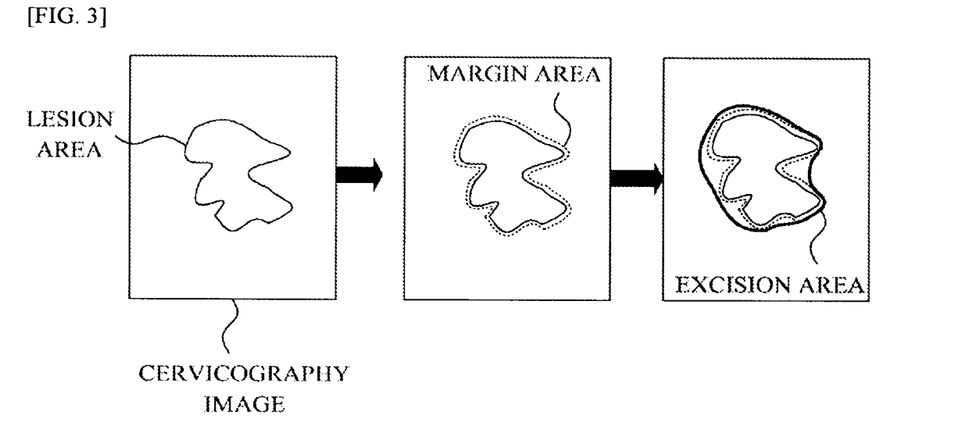
FIG. 3 illustrates an example of a process of determining an excision area.

FIG. 3 illustrates an example of a process of determining an excision area. As described above, the excision area may not be the same as an area in which the lesion area and the margin area are combined because the design of the excision tool is considered. In FIG. 3, the lesion area has many curves and is complex. The analysis apparatus may set a margin area up to a certain distance from the edge of the lesion area. In some cases, the analysis apparatus may determine the margin area as the excision area. However, in the case of FIG. 3, the margin area also has many curves, which may not be suitable for the excision tool design.

In this case, the analysis apparatus may set the excision area that includes a slightly wider area than the margin area but has a gentle curve. The analysis apparatus may set the excision area based on the margin area using image processing technology. The analysis apparatus includes the margin area, but set the excision area so that the edge average of the excision area or the degree of curvature of a specific point has a threshold value or less. Meanwhile, when setting the excision area, the analysis apparatus may set the excision area so that the area to be excised is minimized along with the design complexity of the excision tool. The analysis apparatus may compare an area of the margin area and an area of the excision area and may properly adjust the excision area so that the difference in the areas is less than or equal to a threshold value.

Alternatively, in the case of using the learning model, the learning model may generate an excision area with a gentle curve or an uncomplicated edge while detecting the lesion area in the input image. In this case, the learning model includes the lesion area or the margin area based on the lesion area or margin area detected in the cervicography image and is trained so that the degree of curvature is less than or equal to a threshold value, and at the same time, the difference between the areas of the lesion area or and the margin area and the excision area is less than or equal to a threshold value.

Figure 4:
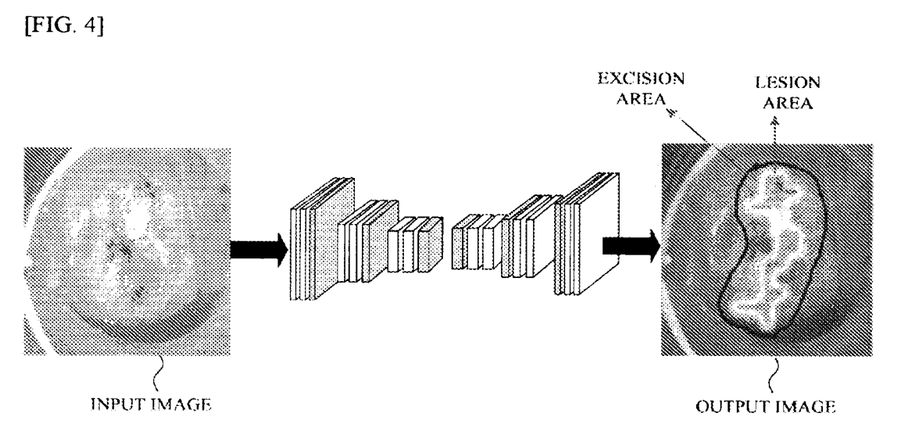
FIG. 4 illustrates an example of the excision area.

FIG. 4 illustrates an example of the excision area. FIG. 4 is an example in which the analysis apparatus inputs an input image (cervicography image) to a learning model (segmentation model, generative model, etc.) to generate an output image.

Since most cancers, including cervical cancer, are eventually caused by the abnormal growth of cells, the cells have a heterogeneous shape different from normal cells. Since these cells are gathered to form an epithelial tissue of a cervix, when cervical precancerous lesion or cervical cancer is developed, a shape of a specific area of the cervix may appear irregular. In order to completely excise the tumor tissue, the possibility that the tumor cells may spread to the surroundings should be considered. Therefore, it is preferable to set the excision area with a certain margin in the lesion area as well as in the observed lesion area.

In FIG. 4, the output image divides and displays the lesion area. Furthermore, the output image may divide and display the excision area including the lesion area and the margin area surrounding the lesion area. The excision area corresponds to the loop shape of the excision tool. Therefore, when the shape and size of the excision area are determined, the excision tool may be selected or the modeling for 3D printer output can be performed.

The learning model (segmentation model or generative model) that generates the lesion area or the excision area has been described. The learning model needs to be trained. In the learning process, input data may be a set of cervicography images, and a label value may be information or images of a lesion area identified in the cervicography image or an excision area where actual conization is performed. Meanwhile, the adversarial generative model trains a generator and a discriminator, and the input data may be a set of cervicography images, and reference data for the determination of the discriminator may be information or images of an actual lesion area or the excision area where conization is performed.

The analysis apparatus may extract the design information of the excision tool based on the excision area information classified or generated by the learning model. The information that the learning model classifies or generates from the input image is 2-dimensional (2D) information. Therefore, the design information of the excision tool is basically 2D information.

Furthermore, the learning model may generate a 3D shape or form with depth information from a 2D image. The analysis apparatus may use any one of various models for generating the 3D image from the 2D image. For example, the analysis apparatus may use models such as 3D GAN, generative radiance fields (GRAF), and neural radiance fields (NeRF). The learning model may receive a plurality of 2D images having different viewpoints to generate a 3D image or 3D information. In this case, the analysis apparatus may extract the design information of the excision tool from the 3D image or information. The analysis apparatus may extract the design information of the excision tool in consideration of a curved surface of the cervical area. In this case, the analysis apparatus may generate customized design information in consideration of the 3D information of the excision area.

Figure 5:
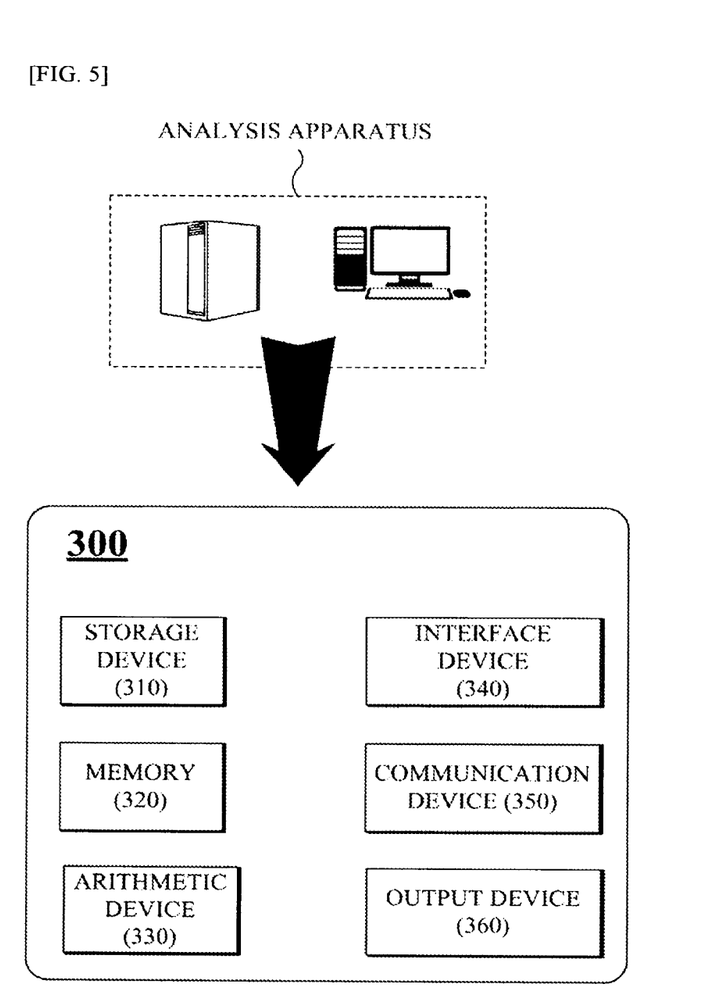
FIG. 5 illustrates an example of an analysis apparatus for analyzing a cervicography image.

FIG. 5 illustrates an example of an analysis apparatus 300 for analyzing a cervicography image. The analysis apparatus 300 corresponds to the above-described analysis apparatus (130 and 140 in FIG. 1). The analysis apparatus 300 may be physically implemented in various forms. For example, the analysis apparatus 300 may have the form of a computer device such as a PC, a server of a network, a data processing-only chipset, or the like.

The analysis apparatus 300 may include a storage device 310, a memory 320, an arithmetic device 330, an interface device 340, a communication device 350, and an output device 360.

The storage device 310 may store other programs or codes for image processing.

The storage device 310 may store a learning model for evaluating the risk of cervical precancerous lesion and cervical cancer, a learning model (segmentation model or generative model) for detecting a lesion area or excision area in a cervicography image, and the like.

The storage device 310 may store a program for generating a source model of the 3D printer according to the excision area information.

The storage device 310 may store input cervicography images.

The storage device 310 may store excision area information calculated by analyzing the cervicography image.

The storage device 310 may store a cervicography image in which a lesion area or an excision area is displayed.

The storage device 310 may store information (size and shape) of previously prepared excision tools.

The memory 320 may store data, information, and the like generated while the analysis apparatus 300 analyzes the cervicography image.

The interface device 340 is a device that receives predetermined commands and data from the outside. The interface device 340 may receive a cervicography image to be analyzed from a physically connected input device or an external storage device. The interface device 340 may transmit analysis results (image, text, 3D printer source model, etc.) to an external object such as a user terminal or a 3D printer. The interface device 340 may transmit final excision area information to an excision tool database. The interface device 340 may receive excision tool information from the excision tool database.

The communication device 350 is a component for receiving and transmitting predetermined information through a wired or wireless network. The communication device 350 may receive the cervicography image to be analyzed from an external object. Alternatively, the communication device 350 may transmit analysis results (image, text, 3D printer source model, etc.) to an external object such as a user terminal or a 3D printer. The communication device 350 may transmit the final excision area information to the excision tool database. The communication device 350 may receive the excision tool information from the excision tool database.

The interface device 340 and the communication device 350 are configured to transmit and receive certain data from a user or another physical object, and therefore, may also be collectively referred to as input/output devices. When the interface device 340 and the communication device 350 are limited to the function of receiving the cervicography image, the interface device 340 and the communication device 350 may be referred to as input devices.

The output device 360 is a device that outputs predetermined information. The output device 360 may output an interface necessary for a data processing process, an analysis result, a final calculated image displaying an excision area, and the like.

The arithmetic device 330 may analyze the cervicography image using instructions or program codes stored in the storage device 310.

The arithmetic device 330 may extract features of the cervicography image using the learning model, and estimate whether a mutation corresponds to high-grade dysplasia or low-grade dysplasia.

The arithmetic device 330 may input the cervicography image to the learning model to detect the lesion area. Furthermore, the arithmetic device 330 may set a margin area up to a constant distance from the edge of the detected lesion area to set the excision area.

The arithmetic device 330 may input the cervicography image to the learning model to directly calculate the excision area. The arithmetic device 330 may calculate excision area information (position, shape, and size of the excision area) for the excision area.

The arithmetic device 330 may calculate the excision area or the excision area information using the learning model. The arithmetic device 330 may calculate 2D excision area information using the learning model. Furthermore, the arithmetic device 330 may also calculate the 3D excision area information using the learning model.

The arithmetic device 330 may generate a source model that may be used in the 3D printer based on the excision area information.

The arithmetic device 330 may compare the excision area information with previously prepared excision tools to select an excision tool suitable for surgery in the excision area.

The arithmetic device 330 may be a device such as a processor, an AP, or a chip in which a program is embedded that processes data and performs certain operations.

Figure 6:
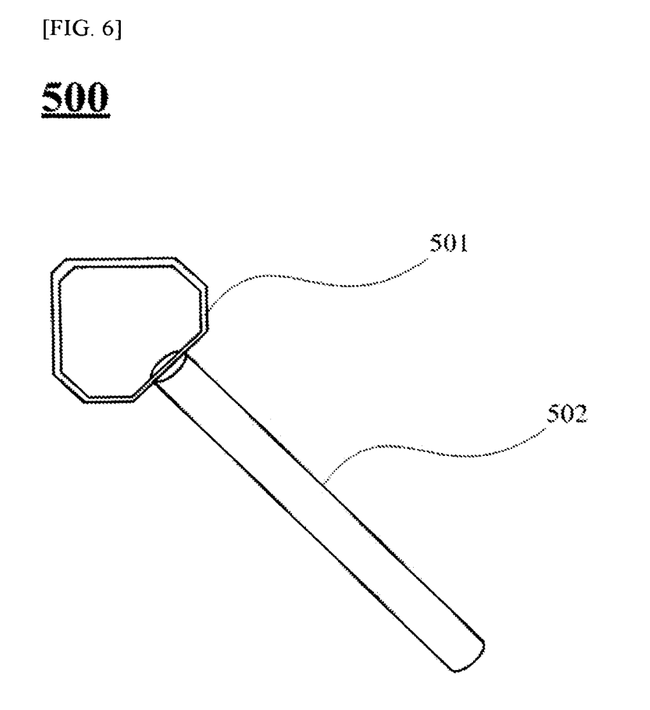
FIG. 6 illustrates an example of an excision tool designed according to excision area information.

FIG. 6 illustrates an example of an excision tool designed according to excision area information In general, the conization is often used to excise abnormal cells generated in a cervix, and the excision tool described in the disclosed technology also means an excision device equipped with a loop used for the conization. As described above, when an excision tool having a loop shape capable of accurately cutting an excision area does not exist, it is possible to manufacture an excision device having a loop of a customized shape using a manufacturing device such as a 3D printer. A surgical method is performed by excising tissues using an electrosurgical method of rotating a loop by applying a certain amount of pressure or more in a state in which the loop is in contact with an affected area, and making a current flow in the loop while rotating. Therefore, in most cases, the shape of the loop 501 is symmetrical on the left and right like decalcomani. Of course, in the case of removing tissue in a very small area, a loop having a narrower width may be used.

Meanwhile, the excision device manufactured by the manufacturing device may have a shape in which a loop 501 and a body 502 may be integrated, or may basically be manufactured so that only the loop may be replaced in the body 502 having a predetermined shape. In the case of the excision tool in which the loop and the body are integrated, a body dimensions may be included in the manufacturing information, and in the case of the excision tool in which the loop may be replaced, only the loop dimensions may be included in the manufacturing information.

In addition, the cervicography image analysis method, the excision area generation method, and the excision tool design method that are described above may be implemented as a program (or application) including an executable algorithm that may be executed on a computer. The program may be stored and provided in a non-transitory computer readable medium.

The non-transitory computer-readable medium is not a medium that stores data therein for a while, such as a register, a cache, a memory, or the like, but means a medium that semi-permanently stores data therein and is readable by an apparatus. Specifically, various applications or programs described above may be provided by being stored in non-transitory readable media such as a compact disk (CD), a digital video disk (DVD), a hard disk, a Blu-ray disk, a universal serial bus (USB), a memory card, a read-only memory (ROM), a programmable read only memory (PROM), an erasable PROM (EPROM), an electrically EPROM (EEPROM), or a flash memory.

The transitory readable media refer to various RAMs such as a static RAM (SRAM), a dynamic RAM (DRAM), a synchronous DRAM (SDRAM), a double data rate SDRAM (DDR SDRAM), an enhanced SDRAM (ESDRAM), a synclink DRAM (SLDRAM), and a direct rambus RAM (DRRAM).

The technology described below uses a learning model that interprets a cervicography image of a patient to accurately specify an excision area on which conization is to be performed. The technology described below enables patient-customized surgery by selecting or designing an excision tool suitable for an excision area on which conization is to be performed. The technology described below provides a customized excision tool suitable for a shape of a lesion so that medical staff may perform optimal surgery.

The present embodiment and the drawings attached to the present specification only clearly show some of the technical ideas included in the above-described technology, and therefore, it will be apparent that all modifications and specific embodiments that can be easily inferred by those skilled in the art within the scope of the technical spirit included in the specification and drawings of the above-described technology are included in the scope of the above-described technology.

What is claimed is:

1. A method of generating excision tool information using a cervicography image, the method comprising:
   receiving, by an analysis apparatus, the cervicography image of a patient;

inputting, by the analysis apparatus, the cervicography image to a learning model to detect a lesion area;

additionally setting, by the analysis apparatus, a margin area based on the lesion area to determine an excision area; and selecting, by the analysis apparatus, one excision tool according to a shape and size of the excision area, or generating a source model for manufacturing an excision tool based on the shape and size of the excision area, wherein the analysis apparatus sets the margin area up to a certain distance from an outline of the lesion area, and then determines the excision area including the margin area but having an edge average or a degree of curvature of a specific point that is less than or equal to a threshold value.

2. The method of claim 1, further comprising inputting, by the analysis apparatus, the cervicography image into the learning model to evaluate whether a lesion of the patient has a high risk.

3. The method of claim 1, wherein the analysis apparatus sets the margin area up to a constant distance from an outline of the lesion area, and the excision area is determined as an outline of the margin area.

4. The method of claim 1, wherein the analysis apparatus determines the excision area so that a difference between areas of the margin area and the excision area is less than or equal to a threshold value.

5. A method of generating excision tool information using a cervicography image, the method comprising:

receiving, by an analysis apparatus, the cervicography image of a patient;

inputting, by the analysis apparatus, the cervicography image to a learning model to detect an excision area; and selecting, by the analysis apparatus, one excision tool according to a shape and size of the excision area, or generating a source model for manufacturing an excision tool based on the shape and size of the excision area, wherein the learning model is trained to generate the excision area in which an edge average or a degree of curvature of a specific point is less than or equal to a threshold value, and at the same time, a difference between areas of a margin area and the excision area is less than or equal to a threshold value, wherein the margin area has a certain distance from an outline of the lesion area.

6. The method of claim 5, further comprising inputting, by the analysis apparatus, the cervicography image into the learning model to evaluate whether a lesion of the patient has a high risk.

7. The method of claim 5, wherein the analysis apparatus inputs the cervicography image to the learning model to detect the excision area in a three-dimensional (3D) area.

8. An analysis apparatus using for generating excision tool information using a cervicography image, comprising:

a storage device configured to store a learning model or program that detects a lesion area in the cervicography image of a patient and determines an excision area based on the lesion area; and a processor configured to determine an excision area including a lesion area in the received cervicography image using the learning model or program, select one excision tool according to a shape and size of the excision area, or generate a source model for manufacturing an excision tool based on the shape and size of the excision area, wherein the processor sets a margin area up to a certain distance from the outline of the lesion area, and then determines the excision area including the margin area but having an edge average or a degree of curvature of a specific point that is less than or equal to a threshold value.

9. The analysis apparatus of claim 8, wherein the arithmetic device determines the excision area so that a difference between areas of the margin area and the excision area is less than or equal to a threshold value.

10. The analysis apparatus of claim 8, wherein the learning model is a model trained to generate the excision area that has an edge average or a degree of curvature of a specific point, which is less than or equal to a threshold value, while including a margin area up to a constant distance from an outline of the lesion area, and at the same time, has a difference between areas of the margin area and the excision area that is less than or equal to a threshold value.

11. The analysis apparatus of claim 8, wherein the processor inputs the cervicography image to the learning model to detect the excision area in a 3D area.

* * * * *